US008681038B1

(12) United States Patent
Noushin et al.

(10) Patent No.: US 8,681,038 B1
(45) Date of Patent: Mar. 25, 2014

(54) RADAR DATA PROCESSING

(75) Inventors: Arjang J. Noushin, Nashua, NH (US); Kenric P. Nelson, Hollis, NH (US)

(73) Assignee: Raytheon Company, Waltham ( * ) Notice: Subject to any disclaimer, the term of this patent is extended or adjusted under 35 U.S.C. 154(b) by 330 days.

(21) Appl. No.: 13/044,159

(22) Filed: Mar. 9, 2011

(51) Int. Cl.
*G01S 13/04* (2006.01)
(52) U.S. Cl.
USPC ............................................ 342/27; 342/196
(58) Field of Classification Search
USPC .......................................................... 342/196
See application file for complete search history.

(56) References Cited

U.S. PATENT DOCUMENTS

| | | | | |
|---|---|---|---|---|
| 4,017,859 | A | * | 4/1977 | Medwin ........................ 342/383 |
| 4,209,843 | A | | 6/1980 | Hyatt |
| 4,551,816 | A | | 11/1985 | Hyatt |
| 4,581,715 | A | | 4/1986 | Hyatt |
| 5,418,536 | A | * | 5/1995 | Lisle et al. ..................... 342/194 |
| 5,465,095 | A | * | 11/1995 | Bryant ........................... 342/159 |
| 5,485,157 | A | * | 1/1996 | Long ............................... 342/160 |
| 5,646,623 | A | | 7/1997 | Walters et al. |
| 6,420,995 | B1 | | 7/2002 | Richmond et al. |
| 7,515,089 | B2 | * | 4/2009 | Szajnowski .................... 342/27 |
| 2006/0187114 | A1 | | 8/2006 | Gibson et al. |

FOREIGN PATENT DOCUMENTS

JP  06342063 A  * 12/1994 ............. G01S 13/28

OTHER PUBLICATIONS

Vassilis Anastassopoulos et al.; Optimal CFAR Detection in Weibull Clutter; Jan. 1995; IEEE Transactions on Aerospace and Electronic Systems; vol. 31, No. 1; pp. 52-64.
J.G. Jones; Multi-Resolution Algorithms for Clutter Rejection; 1990; HMSO London; published by IEEE; 3 pages.
William L. Melvin et al.; Knowledge-Aided Signal Processing: A New Paradigm for Radar and Other Advanced Sensors; Jul. 2006; IEEE Transactions on Aerospace and Electronic Systems vol. 42, No. 3; pp. 983-996.
William L. Melvin et al.; Knowledge-Based Space-Time Adaptive Processing for Airborne Early Warning Radar; Apr. 1998; IEEE AES Systems Magazine; pp. 37-42.
Leonid I. Perlovsky; Cognitive High Level Information Fusion; Dec. 2006; www.sciencedirect.com; vol. 177; pp. 2099-2118.
Michael C. Wicks et al.; Space-Time Adaptive Processing: A knowledge-based perspective for airborne radar; Jan. 2006; IEEE Signal Processing Magazine; pp. 51-65.
Michael C. Wicks et al.; Ultra Narrow Band Adaptive Tomographic Radar; 2005 IEEE; pp. 36-39.

* cited by examiner

*Primary Examiner* — Matthew M Barker
(74) *Attorney, Agent, or Firm* — Pierce Atwood, LLP; Joseph M. Maraia

(57) ABSTRACT

Described are computer-based methods and apparatuses, including computer program products, for radar data processing. In some examples, the method includes determining a plurality of substantially equally spaced frequency intervals within radar data based on an interval size; transforming parts of the radar data within each of the plurality of substantially equally spaced frequency intervals; determining a magnitude of each of the transformed parts of the radar data; and summing the magnitude for each of the transformed parts of the radar data to form adaptive radar data. The adaptive radar data can have a higher signal-to-noise ratio than the radar data.

8 Claims, 5 Drawing Sheets

RADAR DATA PROCESSING

BACKGROUND

Radar systems generally control bandwidth by adapting the transmit signal. The transmit signal is typically configured at build time and is, generally, not modifiable after installation of the radar system. Any adaptation of the transmit signal after installation generally requires extensive modifications to the radar system. Thus, bandwidth management is typically accomplished upon receipt of the radar data. Use of high-resolution radar systems, such as X-band radar systems, with a high-density of objects in a scene, can result in saturation of the radar processing resources (e.g., memory, processor, storage device, etc.) due to the large amount of radar data received from the scene. Current techniques for processing the received radar data, such as noise thresholds and constant false alarm rate (CFAR), do not sufficiently monitor radar processing resources. Thus, a need exists in the art for improved radar data processing.

SUMMARY

One approach is a system that provides radar data processing. The system includes an interval generation module configured to determine a plurality of substantially equally spaced frequency intervals within radar data based on an interval size. The system further includes a transformation module configured to transform parts of the radar data within each of the plurality of substantially equally spaced frequency intervals. The system further includes a magnitude determination module configured to determine a magnitude of each of the transformed parts of the radar data. The system further includes a magnitude addition module configured to sum the magnitude for each of the transformed parts of the radar data to form adaptive radar data, the adaptive radar data having a higher signal-to-noise ratio than the radar data.

Another approach is a method that provides radar data processing. The method includes determining a plurality of substantially equally spaced frequency intervals within radar data based on an interval size. The method further includes transforming parts of the radar data within each of the plurality of substantially equally spaced frequency intervals. The method further includes determining a magnitude of each of the transformed parts of the radar data. The method further includes summing the magnitude for each of the transformed parts of the radar data to form adaptive radar data, the adaptive radar data having a higher signal-to-noise ratio than the radar data.

Another approach is a computer program product that provides radar data processing. The computer program product is tangibly embodied in an information carrier. The computer program product includes instructions being operable to cause a data processing apparatus to determine a plurality of substantially equally spaced frequency intervals within radar data based on an interval size; transform parts of the radar data within each of the plurality of substantially equally spaced frequency intervals; determine a magnitude of each of the transformed parts of the radar data; and summing the magnitude for each of the transformed parts of the radar data to form adaptive radar data, the adaptive radar data having a higher signal-to-noise ratio than the radar data.

In other examples, any of the approaches above can include one or more of the following features.

In some examples, the system further includes a detection module configured to detect one or more objects based on the adaptive radar data. In other examples, the interval generation module is further configured to determine the interval size based on a bandwidth for detection of one or more objects based on the adaptive radar data.

In some examples, the adaptive radar data has a bandwidth that is substantially decreased by a factor of N over a bandwidth of the radar data. In other examples, the adaptive radar data has a signal-to-noise ratio that is substantially higher by a factor of $\sqrt{N}$ over a signal-to-noise ratio of the radar data, wherein N is a reduction of bandwidth of the radar data to the adaptive radar data.

In some examples, the transformation of the parts of the radar data comprises a fast Fourier transform (FFT) module. In other examples, the magnitude of each of the transformed parts of the radar data comprises a maximum absolute value of the transformed parts of the radar data.

In some examples, the method further includes detecting one or more objects based on the adaptive radar data. In other examples, the method further includes determining the interval size based on a bandwidth for detection of one or more objects based on the adaptive radar data.

In some examples, the adaptive radar data has a signal-to-noise ratio that is substantially higher by a factor of $\sqrt{N}$ over a signal-to-noise ratio of the radar data, wherein N is a reduction of bandwidth of the radar data to the adaptive radar data.

The radar data processing techniques described herein can provide one or more of the following advantages. An advantage to the technology is improved robustness of radar data processing in high clutter scenarios by focusing resources on objects of interest, thereby maximizing the efficiency of the radar resources. Another advantage to the technology is the ability to adaptively apply resources designed for high-bandwidth signals into a signal matched to objects of interest, thereby increasing the ability to detect and track targets within dense clutter caused by debris. Another advantage to the technology is the adaptation of received signals improves the filtering of debris from incoming targets during hand-off between radar systems and for management of radar signals during post-intercept processing.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The radar data processing method and apparatus includes technology that, generally, monitors radar processing resources (e.g., memory, processor, communication network, etc.) and utilizes the monitoring to select a variable bandwidth filter which can reduce the number of detections and tracks to a manageable level for the resources. The technology can extract various resolution levels from a signal radar pulse (also referred to as radar data) via the variable bandwidth filter without changing the signal-to-noise ratio of the radar signal. For example, high, medium, and low resolution radar signals are available for detection, tracking, and discrimination depending on radar data processing resource requirements and/or availability.

The technology can adjust the resolution of the radar data to accommodate the resource needs of the technology, to mitigate clutter, and/or to isolate targets of interest. The technology can utilize a multi-pass filter to improve signal-to-noise ratio by non-coherently adding energy from band-pass portions of signal to the low-pass output. The technology can improve the robustness and precision of track and discrimination functions by adaptively managing resources so that tracking algorithms are refined based on discrimination and tracking models adapt to include correlated motion of multiple scatters.

Figure 1:
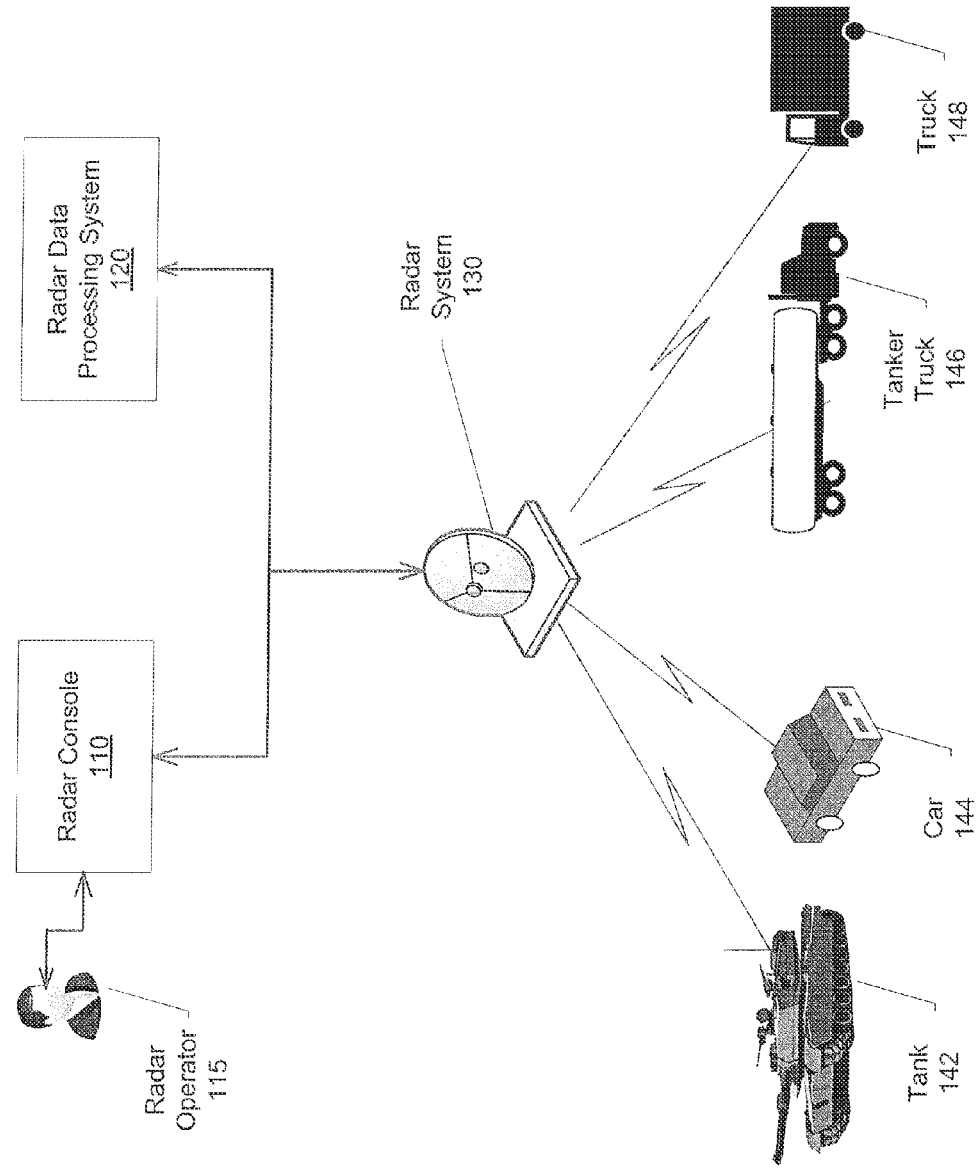
FIG. 1 is a diagram of an exemplary radar data processing environment.

FIG. 1 is a diagram of an exemplary radar data processing environment 100. The environment 100 includes a radar console 110, a radar data processing system 120, and a radar system 130. A radar operator 115 tracks a plurality of target objects utilizing the system 100. In some examples, the plurality of target objects includes a tank 142, a car 144, a tanker trailer 146, and a truck 148. The radar system 130 transmits electromagnetic waves (e.g., high range resolution radar, synthetic aperture radar, etc.) at the target object and receives reflections of the electromagnetic waves from the target object. The radar system 130 communicates radar data from the reflections of the electromagnetic waves to the radar console 110 and/or the radar data processing system 120. The radar data processing system 120 processes the radar data to detect one or more objects.

Figure 2:
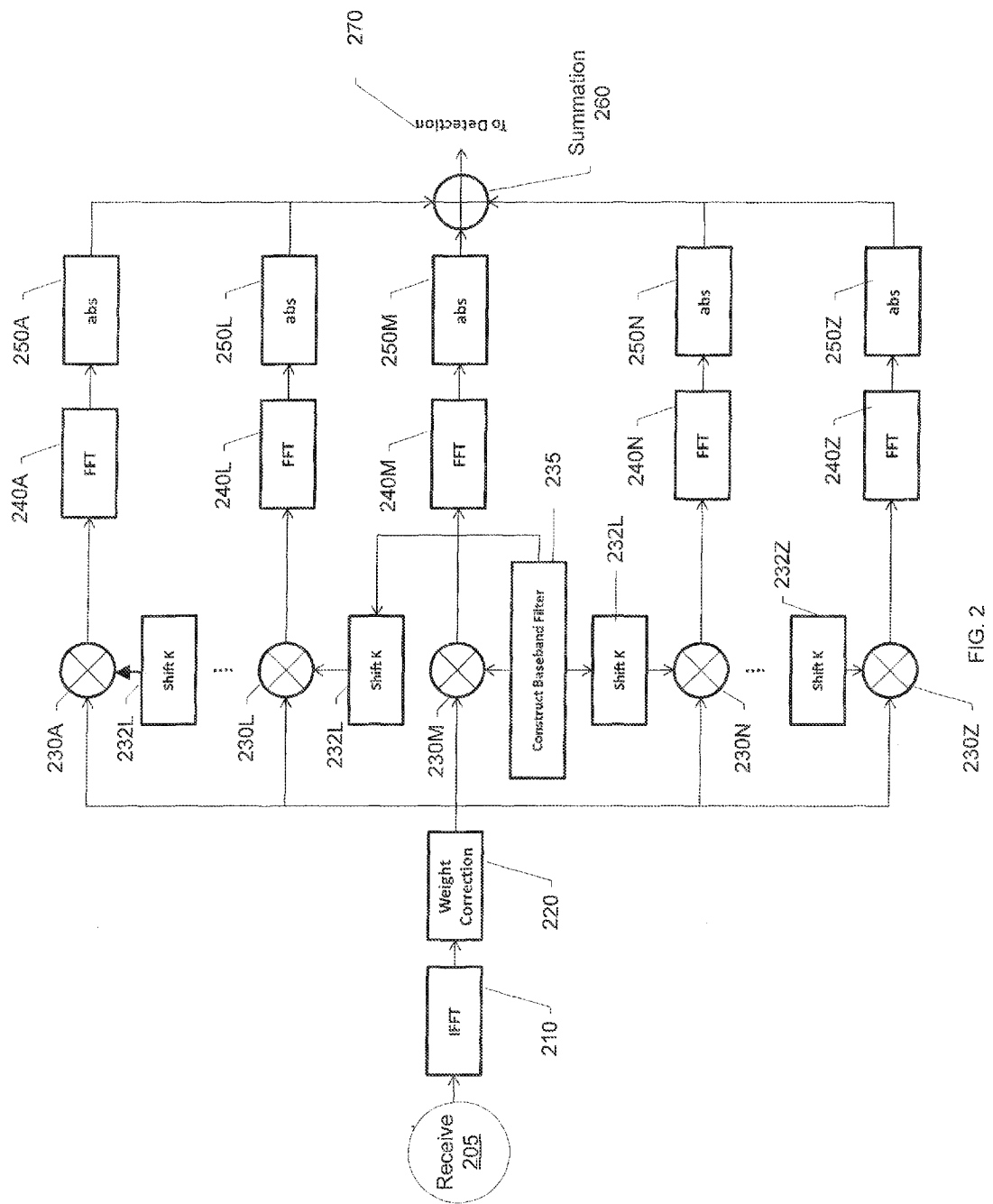
FIG. 2 is a block diagram of an exemplary radar data processing process.

FIG. 2 is a block diagram of an exemplary radar data processing process 200 utilizing, for example, the radar data processing system 120 of FIG. 1. The radar data processing system 120 receives (205) radar data. The radar data processing system 120 performs an inverse fast Fourier transform (IFFT) (210) on the radar data. The IFFT (210) converts the chirped pulse to the domain necessary for bandwidth filtering. The radar data processing system 120 performs a weight correction (220) on the radar data and splits the radar data based on an interval size (e.g., equally spaced frequency intervals, substantially equaled spaced frequency intervals, etc.) to form radar data parts. The splitting of the radar data advantageously enables the process 200 to increase the signal-to-noise ratio by processing each individual segment instead of the entire segment as a whole, thereby customizing the processing based on the individual characteristics of the segment.

The radar data processing system 120 shifts (230A through 230L, 230M, 230N through 230Z (generally referred to as 230)) each of the split radar data parts by a shift factor (232L through 232L, 232M, 232N through 232Z (generally referred to as 232)), respectively. The radar data processing system 120 shifts (230L, 230M, and 230N) the respective radar data parts based on a baseband filter 235 and/or a parameter K, which controls the bandwidth between passband filters. The radar data processing system 120 performs a fast Fourier transform (FFT) (240A through 240L, 240M, 240N through 240Z (generally referred to as 240)) on the respective radar data parts. The radar data processing system 120 determines an absolute value (250A through 250L, 250M, 250N through 250Z (generally referred to as 250)) of the respective radar data parts. The individual processing of the radar data parts (steps 210, 220, 230, 232, 240, and 250) enables the bandwidth of the radar data to decrease without losing the signal-to-noise ratio of the higher bandwidth radar data. In other words, the individual processing of the radar enables the radar data processing system 120 to utilize resources on the important details in the radar data (e.g., area associated with a possible object, high priority geographic region, etc.) while decreasing the overall resource requirements for processing the radar data.

The radar data processing system 120 sums (260) the respective radar data to form adaptive radar data. The summation of the respective radar data can be an incoherent addition of the respective radar data which advantageously enables energy in non-overlapping segments to be integrated due to the frequency dependency of the phase relation of objects at various ranges. The radar data processing system 120 communicates (270) the adaptive radar data to a detection system (not shown) and/or a storage device (not shown) for detection processing.

Figure 3:
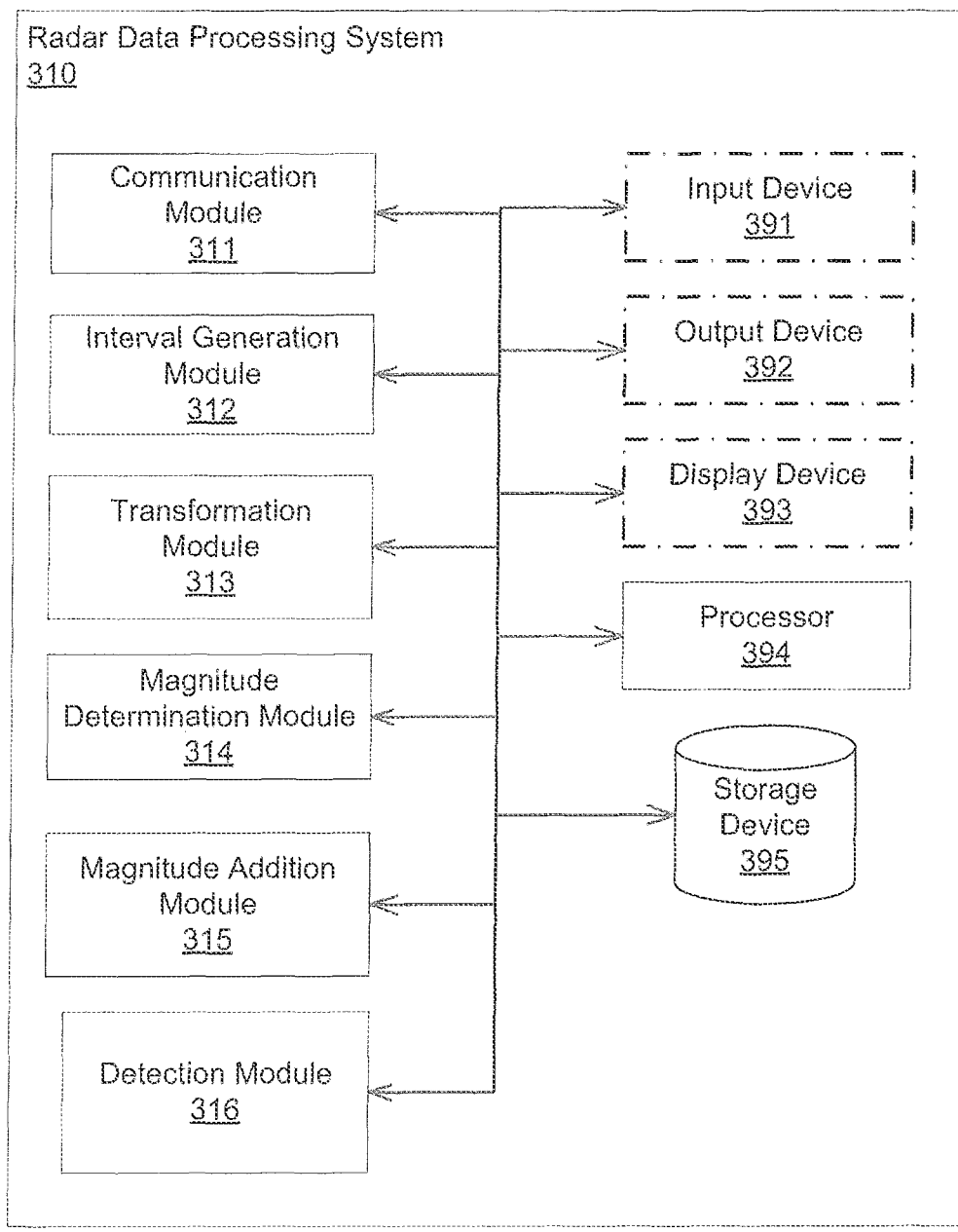
FIG. 3 is a diagram of an exemplary radar data processing system.

FIG. 3 is a diagram of an exemplary radar data processing system 310. The radar data processing system 310 includes a communication module 311, an interval generation module 312, a transformation module 313, a magnitude determination module 314, a magnitude addition score module 315, a detection module 316, an input device 391, an output device 392, a display device 393, a processor 394, and a storage device. The modules and devices described herein can, for example, utilize the processor 394 to execute computer executable instructions and/or include a processor to execute computer executable instructions (e.g., an encryption processing unit, a field programmable gate array processing unit, etc.). It should be understood that the radar data processing system 310 can include, for example, other modules, devices, and/or processors known in the art and/or varieties of the illustrated modules, devices, and/or processors.

The communication module 311 communicates information to/from the radar data processing system 310. The interval generation module 312 determines a plurality of substantially equally spaced frequency intervals within radar data based on an interval size, which is designed to match the bandwidth of an object of interest. In some examples, the interval generation module 312 determines the interval size based on a bandwidth for detection of one or more objects based on the adaptive radar data. Tables 1-2 illustrate exemplary substantially equally spaced frequency intervals.

TABLE 1

Exemplary Frequency Intervals

| Interval Identification | Frequency Interval | Frequency Variance |
|---|---|---|
| AB12 | 200 MHz-300 MHz | ±0.001% |
| AB13 | 301 MHz-400 MHz | ±0.002% |
| ... | ... | ... |
| AB33 | 2400 MHz-2500 MHz | ±0.003% |
| AB34 | 2501 MHz-2600 MHz | ±0.01% |

TABLE 2

Exemplary Frequency Intervals

| Interval Identification | Frequency Interval | Frequency Variance |
|---|---|---|
| ... | ... | ... |
| Z33 | 200 MHz-250 MHz | ±2.0 MHz |
| Z34 | 251 MHz-400 MHz | ±3.0 MHz |
| ... | ... | ... |
| Z44 | 1400 MHz-1450 MHz | ±5.0 MHz |
| Z45 | 1451 MHz-1500 MHz | ±4.0 MHz |
| ... | ... | ... |

The transformation module 313 transforms parts of the radar data within each of the plurality of substantially equally spaced frequency intervals. The magnitude determination module 314 determines a magnitude of each of the transformed parts of the radar data. The magnitude addition module 315 sums the magnitude for each of the transformed parts of the radar data to form adaptive radar data, the adaptive radar data having a higher signal-to-noise ratio than the radar data. The detection module 316 detects one or more objects based on the adaptive radar data.

In other examples, the adaptive radar data has a bandwidth that is substantially decreased by a factor of N over a bandwidth of the radar data. In some examples, the adaptive radar data has a signal-to-noise ratio that is substantially higher by a factor of $\sqrt{N}$ over a signal-to-noise ratio of the radar data, wherein N is a reduction of bandwidth of the radar data to the adaptive radar data. The increase in the signal-to-noise ratio of the adaptive radar data over the radar data advantageously provides increased fidelity of the radar data (e.g., faster identification of targets, increased accuracy of identification of target, etc.) with decreased resource usage (e.g., less processor usage, efficient memory usage, etc.) due to the reduction in bandwidth. In other examples, the transformation of the parts of the radar data includes a fast Fourier transform (FFT) module. In some examples, the magnitude of each of the transformed parts of the radar data comprises a maximum absolute value of the transformed parts of the radar data.

The input device 391 receives information associated with the radar data processing system 310 (e.g., instructions from a user, instructions from another computing device, etc.) from a user (not shown) and/or another computing system (not shown). The input device 391 can include, for example, a keyboard, a scanner, etc. The output device 392 outputs information associated with the radar data processing system 310 (e.g., information to a printer (not shown), information to a speaker, etc.).

The display device 393 displays information associated with the radar data processing system 310 (e.g., status information, configuration information, etc.). The processor 394 executes the operating system and/or any other computer executable instructions for the radar data processing system 310 (e.g., executes applications, etc.).

The storage device 395 stores radar data and/or adaptive radar data. The storage device 395 can store information and/or any other data associated with the radar data processing system 310. The storage device 395 can include a plurality of storage devices and/or the radar data processing system 310 can include a plurality of storage devices (e.g., an radar input storage device, a transformed radar data storage device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 4:
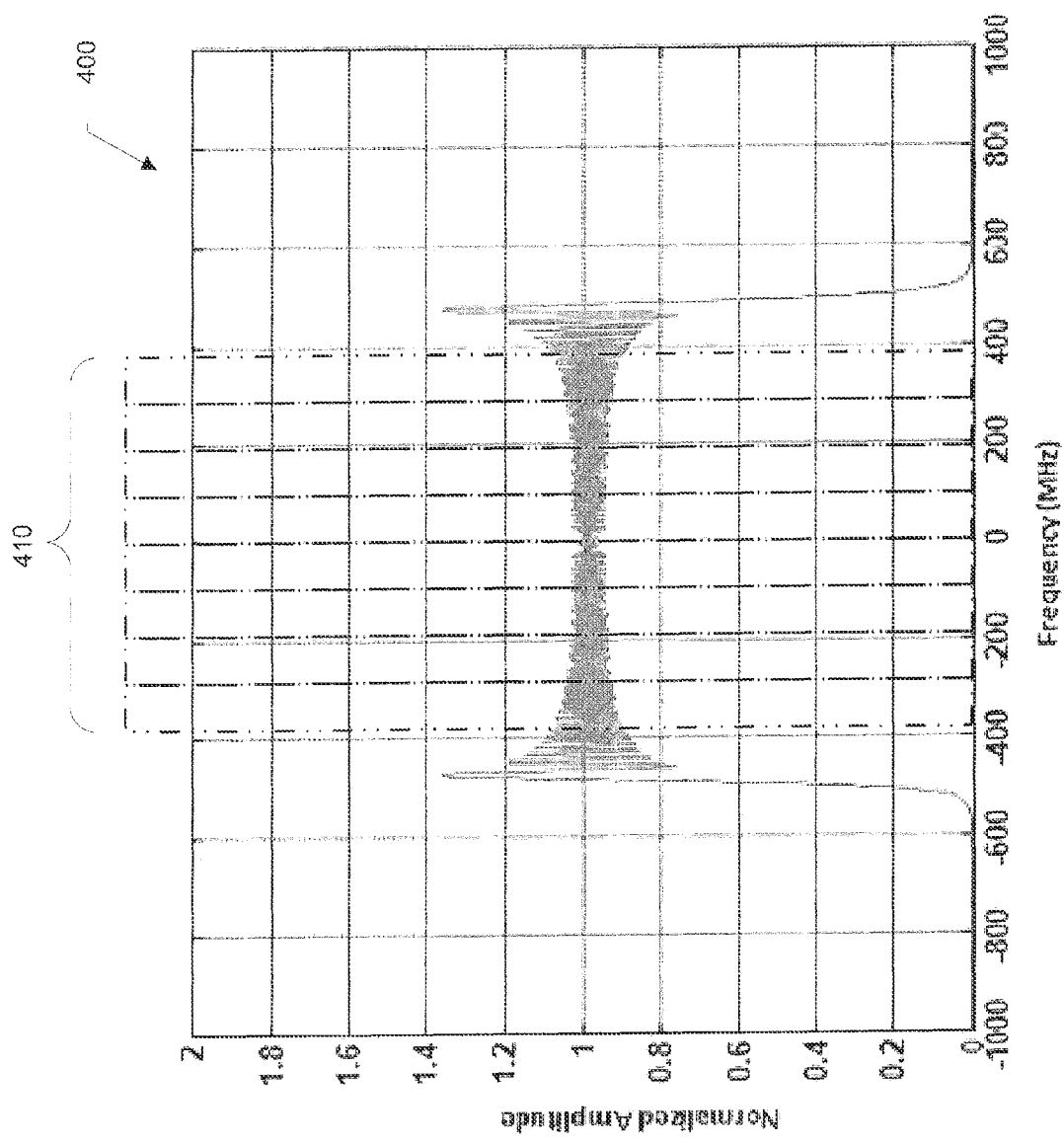
FIG. 4 is a diagram of an exemplary power spectrum of radar data with frequency intervals.

FIG. 4 is a diagram of an exemplary power spectrum 400 of radar data with frequency intervals. The power spectrum 400 is the normalized power spectrum of the radar data having a bandwidth of 1.0 GHz. The power spectrum 400 is divided into a plurality of substantially equally spaced frequency intervals 410.

Figure 5:
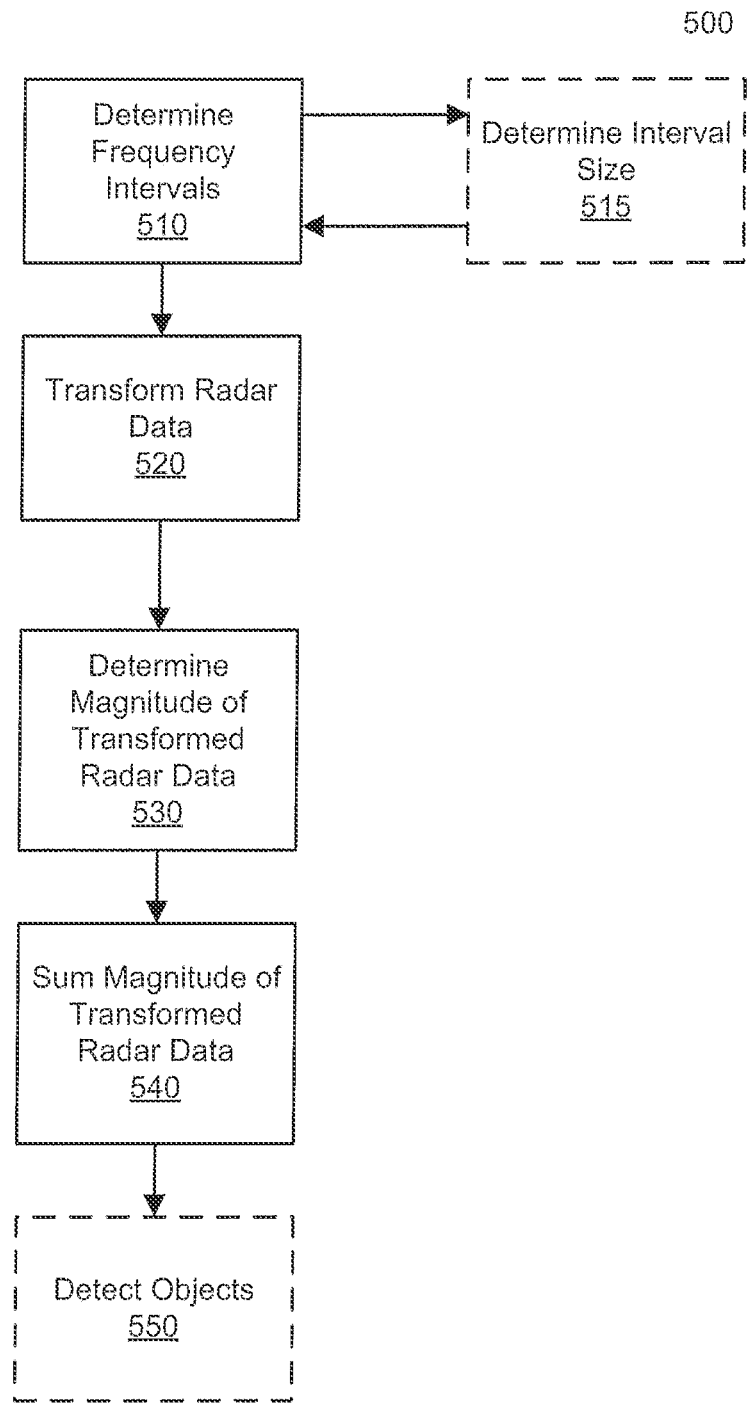
FIG. 5 is a flowchart of an exemplary radar data processing method.

FIG. 5 is a flowchart of an exemplary radar data processing method 500 utilizing, for example, the data processing system 310 of FIG. 3. The interval generation module 312 determines (510) a plurality of substantially equally spaced frequency intervals within radar data based on an interval size. The transformation module 313 transforms (520) parts of the radar data within each of the plurality of substantially equally spaced frequency intervals. The magnitude determination module 314 determines (530) a magnitude of each of the transformed parts of the radar data. The magnitude addition module 315 sums (540) the magnitude for each of the transformed parts of the radar data to form adaptive radar data. The adaptive radar data has a higher signal-to-noise ratio than the radar data which advantageously increases the details available for object detection while decreasing the resources required to process the adaptive radar data. The transformation (520), the determination (530), and the summation (540) of the parts of the radar data to form the adaptive radar data advantageously enables signal-to-noise in non-overlapping segments to be integrated due to the frequency dependency of the phase relation of objects at various ranges. The integration of the signal-to-noise advantageously increases the signal-to-noise ratio of the adaptive radar data from the radar data, thereby increasing the accuracy of range measurements.

In some examples, an object detection module (not shown) detects (550) one or more objects based on the adaptive radar data. In other examples, the interval generation module 312 determines (515) the interval size based on a bandwidth for detection of one or more objects based on the adaptive radar data. In some examples, the adaptive radar data has a signal-to-noise ratio that is substantially higher by a factor of $\sqrt{N}$ over a signal-to-noise ratio of the radar data, thereby advantageously increasing the technology's ability to detect objects. N is a reduction of bandwidth of the radar data to the adaptive radar data. Table 3 illustrates exemplary bandwidths and signal-to-noise ratios for radar data and adaptive radar data.

TABLE 3

Exemplary Bandwidths and Signal-to-Noise Ratios

| | Radar Data | | Adaptive Radar Data | |
|---|---|---|---|---|
| Radar Data Identification | Bandwidth | Signal-to-Noise Ratio | Bandwidth | Signal-to-Noise Ratio |
| A23 | 100.0 GHz | 10 dB | 10.0 GHz | 31.6 dB |
| B311 | 1000.0 GHz | 5 dB | 500.0 GHz | 7 dB |
| D32 | 500.0 GHz | 15 dB | 100.0 GHz | 33.45 dB |

In some examples, the radar data processing system 120 processes the radar data (in this example, wideband signal) to form adaptive radar data in accordance with the following equations. In this example, the output of the equations is a positive real valued function that is utilized for the detection of objects as described herein.

$$\sum_{n=1}^{N} a_n r(t-\tau_n) \rightarrow \boxed{r(-t)} \rightarrow \sum_{n=1}^{N} a_n r(t-\tau_n) * r(-t)$$

wherein:
N=number of equally spaced frequency interval;
a=amplitude;
t=time;
τ=pulse width of the radar signal; and
r( )=fast Fourier transform (FFT).

In other examples, the radar data processing system 120 processes the radar data (in this example, narrowband signal) to form adaptive radar data in accordance with the following equations. In this example, the output of the equations is utilized for the detection of objects as described herein.

$$\sum_{n=1}^{N} a_n r(t-\tau_n) \rightarrow \boxed{h(t)} \rightarrow$$

$$\boxed{r(-t) * h(-t)} \rightarrow \sum_{n=1}^{N} a_n r(t-\tau_n) * r(-t) * h(t) * h(-t)$$

wherein:
N=number of scattering centers in the beam;
a=amplitude;
t=time;
τ=pulse width of the radar signal;
r( )=returned signal; and
h( )=match filter impulse response.

In some examples, the radar data processing system 120 processes the radar data (in this example, narrowband signal) to form adaptive radar data in accordance with the following equations. In this example, the output of the equations is utilized for the detection of objects as described herein.

$$\sum_{n=1}^{N} a_n r(t-\tau_n) \rightarrow$$

$$\boxed{r(-t)} \rightarrow \boxed{h(t) * h(-t)} \rightarrow \sum_{n=1}^{N} a_n r(t-\tau_n) * r(-t) * h(t) * h(-t)$$

wherein:
N=number of scattering centers in the beam;
a=amplitude;
t=time; and
τ=pulse width of the radar signal;
r( )=returned signal; and
h( )=match filter impulse response.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A system for radar data processing, the system comprising:
    an interval generation processor configured to determine a plurality of substantially equally spaced frequency intervals within radar data based on an interval size;
    a fast Fourier transformation processor configured to transform parts of the radar data within each of the plurality of substantially equally spaced frequency intervals;
    a magnitude determination processor configured to determine a magnitude of each of the transformed parts of the radar data; and
    a magnitude addition processor configured to sum the magnitude for each of the transformed parts of the radar data to form adaptive radar data, the adaptive radar data having a higher signal-to-noise ratio than the radar data.

2. The system of claim 1, further comprising a detection processor configured to detect one or more objects based on the adaptive radar data.

3. The system of claim 1, wherein the interval generation processor further configured to determine the interval size based on a bandwidth for detection of one or more objects based on the adaptive radar data.

4. The system of claim 1, wherein the magnitude of each of the transformed parts of the radar data comprises a maximum absolute value of the transformed parts of the radar data.

5. A method, executed by one or more processors, for radar data processing, the method comprising:
    determining a plurality of substantially equally spaced frequency intervals within radar data based on an interval size;
    transforming parts of the radar data within each of the plurality of substantially equally spaced frequency intervals;
    determining a magnitude of each of the transformed parts of the radar data; and
    summing the magnitude for each of the transformed parts of the radar data to form adaptive radar data, the adaptive radar data having a higher signal-to-noise ratio than the radar data.

6. The method of claim 5, further comprising detecting one or more objects based on the adaptive radar data.

7. The method of claim 5, further comprising determining the interval size based on a bandwidth for detection of one or more objects based on the adaptive radar data.

8. A non-transitory computer readable media including instructions stored thereon which, when executed cause a processing apparatus to:
    determine a plurality of substantially equally spaced frequency intervals within radar data based on an interval size;
    transform parts of the radar data within each of the plurality of substantially equally spaced frequency intervals;
    determine a magnitude of each of the transformed parts of the radar data; and
    sum the magnitude for each of the transformed parts of the radar data to form adaptive radar data, the adaptive radar data having a higher signal-to-noise ratio than the radar data.

* * * * *